W. G. VREELAND.
HYDRAULIC SWIVEL.
APPLICATION FILED DEC. 29, 1916.

1,296,573.

Patented Mar. 4, 1919.
2 SHEETS—SHEET 1.

INVENTOR.
WALTER G. VREELAND
BY
A. S. McLundie.
ATTORNEY.

W. G. VREELAND.
HYDRAULIC SWIVEL.
APPLICATION FILED DEC. 29, 1916.
1,296,573.
Patented Mar. 4, 1919.
2 SHEETS—SHEET 2.
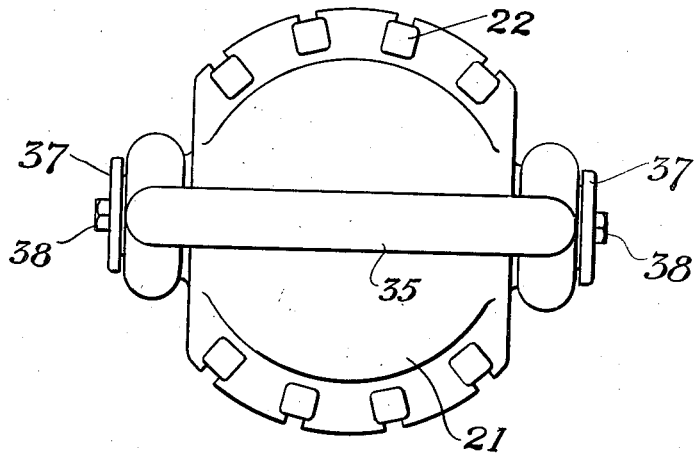
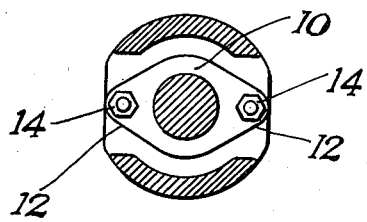
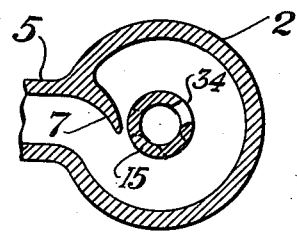
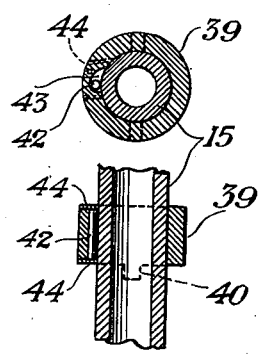
INVENTOR.
WALTER G. VREELAND
BY
A. S. McLundie.
ATTORNEY.

UNITED STATES PATENT OFFICE.

WALTER G. VREELAND, OF CHATTANOOGA, TENNESSEE, ASSIGNOR TO LUCEY MANUFACTURING CORPORATION, OF CHATTANOOGA, TENNESSEE, A CORPORATION OF TENNESSEE.

HYDRAULIC SWIVEL.

1,296,573.  Specification of Letters Patent.  Patented Mar. 4, 1919.

Application filed December 29, 1916. Serial No. 139,567.

*To all whom it may concern:*

Be it known that I, WALTER G. VREELAND, a citizen of the United States, residing at Chattanooga, in the county of Hamilton and State of Tennessee, have invented certain new and useful Improvements in Hydraulic Swivels, of which the following is a specification.

My invention relates to a well-drilling apparatus, and has for one object to provide an improved connection between the rotating stem and the hoisting cable, which will permit the operation of the stem and at the same time avoid any twisting in the cable.

Another object is to provide means whereby the apparatus may be used with a hollow drill stem through which water is circulated to clear the borings from the drill; and to provide the stationary element of the swivel with a connection to the water supply pipe.

In carrying my invention into practice I provide a separate housing for the bearing, entirely separate from the water passage, thus preventing any sand or grit entering the bearing, which has been the great disadvantage in swivels heretofore in use.

A further object of this invention consists in having the bearing in a separate casing where I locate and maintain a supply of lubricant to the bearing, thereby keeping the bearing in the best working condition, and also providing means for introducing the lubricant to the bearing without taking apart any other parts of the swivel.

A still further object resides in the provision of means for taking up the wear on the upper surface of the drill stem, thus eliminating any upward play of the stem, and keeping the antifriction elements in close contact.

And a still further object of the invention resides in the provision of means whereby the bushing connecting the swivel stem with the drill stem can be locked to the swivel stem so that it cannot work loose or unscrew.

With these and other objects in view, I will now proceed to describe a specific embodiment of the present invention which I have found in practice to give good results, and which is illustrated in the accompanying drawings forming a part hereof, wherein:

Fig. 3 is a plan of the swivel.

Fig. 4 is a horizontal section on the line 4—4 of Fig. 1.

Fig. 5 is a horizontal section on the line 5—5 of Fig. 1.

Fig. 6 is a horizontal section on the line 6—6 of Fig. 1.

Fig. 7 is a fragmentary section of the locking collar, taken at right angles to Fig. 1.

Figures 1, 2:
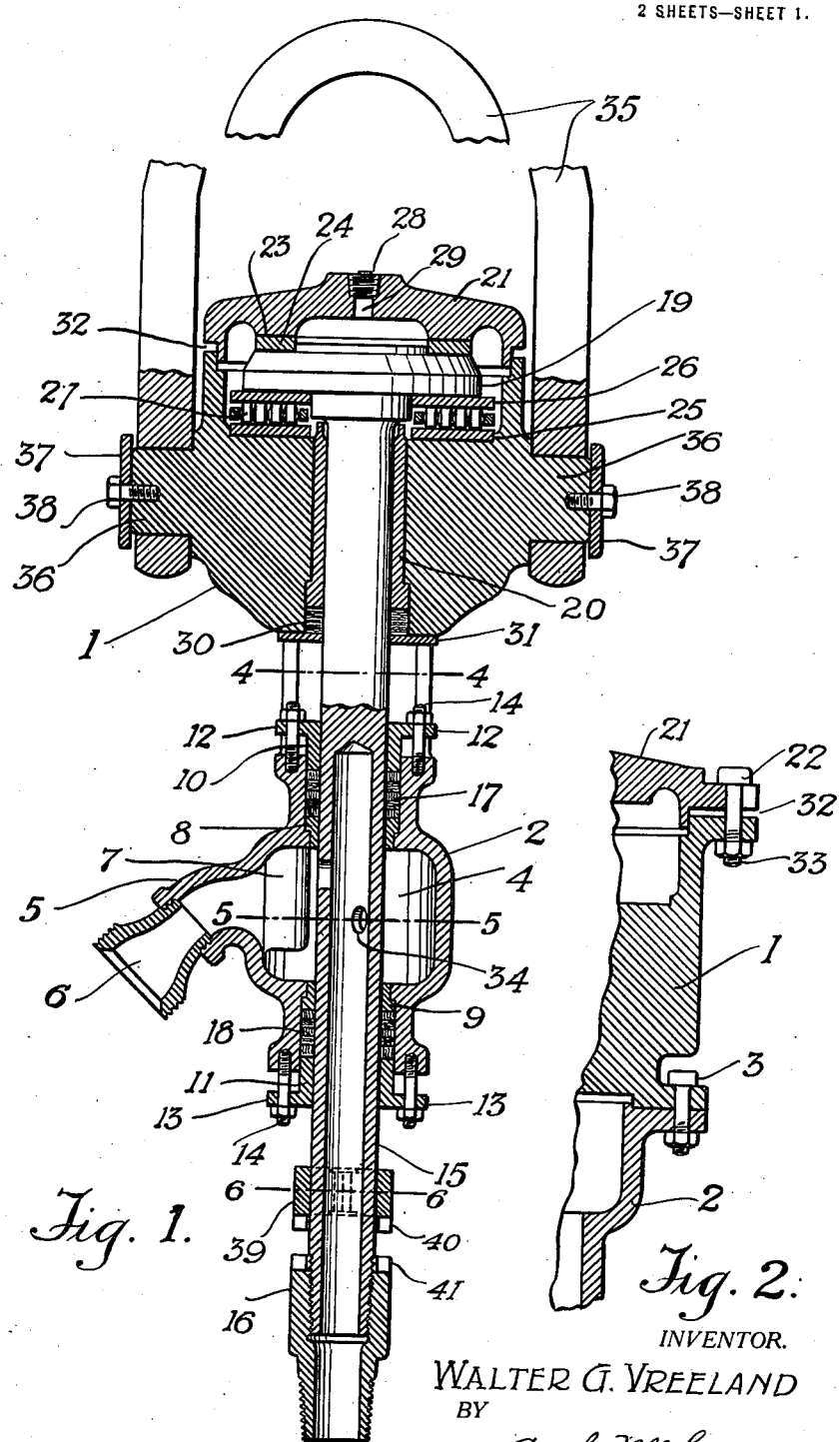
Figure 1 is a vertical cross section of swivel.
Fig. 2 is a vertical cross section of the upper part of the swivel, taken at right angles to Fig. 1.

In detail:

As embodied in the accompanying drawing, the swivel consists of an upper housing 1 and a lower housing 2 connected together by means of bolts 3. The lower housing 2 has a central compartment or chamber 4, out of which leads a pipe connecting element 5 to which is connected a socket 6 for connection to a flexible water supply pipe (not shown). Located in the compartment 4 adjacent the pipe 5 is a fluid deflecting element 7, to prevent the incoming fluid from being swirled around the compartment by the centrifugal force of the revolving stem.

The bushings 8 and 9 are fitted in the openings at both ends of the housing 2. Glands 10 and 11 are fitted in both ends of the housing 2, and are provided with opposite external lugs 12 and 13 respectively, through which pass adjusting screws 14, the latter being threaded into both ends of the lower housing. Extending through both ends of the housing 2 is a hollow stem 15 which projects below the gland 11 and is connected to the bushing or joint 16 which is threaded externally for connection to the drill rod (not shown). Suitable packings 17 and 18 are interposed between the glands 10 and 11 and the bushings 8 and 9, so as to form water tight joints between the stem 15 and both ends of the lower housing.

The upper portion of the stem 15 is solid and extends through the opening in the upper housing 1, beyond which the stem is enlarged in diameter as at its extreme end 19. A bushing 20 is fitted in the opening of the housing 1 and embraces the stem.

A removable bonnet 21 is secured to the top of the housing 1 by means of the bolts 22 and is provided in its inner side with an annular seat 23. Fastened to the upper side of the portion 19 of the stem is a wearing ring 24, the upper side of which comes in contact with the seat 23 of the bonnet. A ring 25 is provided on the seat of the inner portion of the housing 1, and a ring 26 on the lower side of the portion 19 of the stem, there being antifriction elements 27 interposed between the rings 25 and 26; said elements may consist of rollers, balls, cones, etc.

I provide a plug 28 which can be removed from the opening 29 to introduce and replenish the supply of lubricant to the bearing.

I also provide a felt packing 30 which is held in place by the retaining ring 31, which will retain the oil in the upper housing.

Provision is also made for taking up the wear between the ring 24 and the surface 23, by having the clearance 32 between the upper part of the housing 1 and the bonnet 21, so that by adjusting the bolts 22 a contact can be maintained.

In order that water may be introduced into the hollow stem, I provide passages 34 in that portion of the stem 15 lying within the compartment 4, through which the water passes into the stem 15 and from thence to the drill rod.

Connection between the swivel and the cable (the latter not shown) is provided for in the usual way by means of a bail link 35, which straddles the upper housing and engages the trunnions 36, forming part of the upper housing, and is held in place by means of the plates 37 which are secured to the housing with the studs 38.

To obviate the danger of the bushing 16 working loose or unscrewing when the drill stem is being disconnected, I provide a collar 39 which is free to travel in one direction and becomes locked to the stem when turned in the opposite direction. The collar 39 is free to move longitudinally on the stem 15 and is provided with lugs 40 which engage in the slots 41 in the upper face of the bushing 16. On the inner face of the collar 39, I provide a recess or recesses 43 which have located therein, rollers 42 held in position at top and bottom by the plates 44. It will be seen that if the collar is turned so that the roller 42 is forced by the cam face of the recess or recesses toward the smaller end, the roller or rollers will press against the stem and thus stop further movement of the collar in relation to the stem. If the collar is turned in the opposite direction, there will be a free movement of the collar owing to the space between the face of the recess or recesses and the stem being larger than the roller. Thus if the collar 39 is connected to the bushing 16 by means of the lugs 40 engaging in the slots 41, the collar can be arranged so that the locking effect will be obtained when the bushing tends to unscrew.

From the foregoing description it will be noted that the swivel is divided into two separate units 1 and 2, the lower housing taking care of the flow and passage of the fluid with no possible chance for the escape of any fluid to the upper housing, while the upper housing takes care of the bearing between the rotating stem and the swivel member 1.

I also provide means for retaining the bearing in a lubricated condition and maintaining the latter entirely in the upper housing.

I also provide means for taking up the wear on the extreme upper end of the stem, such wear being caused by what is known as spudding, and this is compensated for by simply renewing the ring 24, thus the replacement of any of the other parts of the swivel is rendered unnecessary.

The method which I employ to lock the bushing on the swivel stem is novel, inasmuch as no preparation is necessary on the stem, such as threading or keying, to cooperate with the locking means.

While, in the foregoing, I have described a specific embodiment of the present invention, it is nevertheless to be understood that, in practice, I may resort to such modifications as fall within the scope of the appended claims.

I claim:

1. A hydraulic swivel comprising upper and lower housings, said upper housing having a removable bonnet, a swivel stem having its upper end enlarged to form the upper seat of a swivel bearing with the upper housing, a wearing ring interposed between the bonnet and the stem, the lower portion of the stem having at least one passage and projecting through the lower housing and said passage forming communication between the housing and the stem.

2. A hydraulic swivel comprising upper and lower housings, the latter having a water-inlet, the upper housing having a removable and adjustable bonnet, a swivel stem having its upper end enlarged to form the upper seat of a swivel bearing with the upper housing, antifriction elements interposed between said stem and housing, wearing rings located between said enlarged end and said housing, antifriction members located between said rings, a wearing ring between the upper end of stem and said bonnet, the lower portion of said stem having a passage and projecting through the lower housing and provided with openings for communication between the water-inlet and said passage.

3. A hydraulic swivel comprising upper and lower housings, the latter having a water inlet, a swivel stem having its upper end enlarged to form the seat of a bearing with the upper housing and the lower portion of said stem provided with passages for communication between the interior of the lower housing and the interior of the stem, and a deflecting element located in the interior of the lower housing for preventing incoming fluid from being swiveled around the compartment of the lower housing by the centrifugal force of the revolving stem.

In testimony whereof I have hereunto set my hand in the presence of two subscribing witnesses.

WALTER G. VREELAND.

Witnesses:
  H. L. THATCHER,
  L. C. KENYON.